(12) United States Patent
Yahata et al.

(10) Patent No.: US 7,841,171 B2
(45) Date of Patent: Nov. 30, 2010

(54) EXHAUST EMISSION CONTROL DEVICE FOR INTERNAL COMBUSTION ENGINE

(75) Inventors: Shigeto Yahata, Obu (JP); Tsukasa Kuboshima, Okazaki (JP); Satoru Nosaka, Nagoya (JP); Kazuharu Tochikawa, Kariya (JP)

(73) Assignee: Denso Corporation, Kariya (JP)

( * ) Notice: Subject to any disclaimer, the term of this patent is extended or adjusted under 35 U.S.C. 154(b) by 1056 days.

(21) Appl. No.: 11/594,854

(22) Filed: Nov. 9, 2006

(65) Prior Publication Data

US 2007/0101697 A1 May 10, 2007

(30) Foreign Application Priority Data

Nov. 9, 2005 (JP) .............................. 2005-324869

(51) Int. Cl.
*F01N 3/00* (2006.01)
*B01D 46/00* (2006.01)
*B01D 53/30* (2006.01)

(52) U.S. Cl. ................................ 60/297; 95/283; 95/19; 95/20; 55/523; 60/296; 60/274

(58) Field of Classification Search .................... 60/297, 60/296, 274; 95/283, 19, 20; 55/523, DIG. 10
See application file for complete search history.

(56) References Cited

U.S. PATENT DOCUMENTS

| 6,966,178 B2 | 11/2005 | Saito et al. | |
| 7,319,928 B2 | 1/2008 | Hodjati et al. | |
| 2004/0194453 A1* | 10/2004 | Koga et al. | 60/295 |
| 2004/0226284 A1* | 11/2004 | Kitahara et al. | 60/285 |
| 2005/0022520 A1 | 2/2005 | Shirakawa et al. | |
| 2006/0059901 A1 | 3/2006 | Saito et al. | |

FOREIGN PATENT DOCUMENTS

| DE | 10234340 | 10/2003 |
| EP | 1 229 223 B1 | 2/2002 |
| JP | 2001-280118 | 10/2001 |
| JP | 2004-036454 | 2/2004 |

OTHER PUBLICATIONS

Office Action issued from German Patent Office dated Jun. 18, 2008 in DE Patent Application No. 10 2006 035 411.7 with English translation.

* cited by examiner

*Primary Examiner*—Thomas E Denion
*Assistant Examiner*—Michael Carton
(74) *Attorney, Agent, or Firm*—Nixon & Vanderhye P.C.

(57) ABSTRACT

A method is disclosed for estimating an amount of deposited particulates (PM) in a collector of an internal combustion engine. The method includes estimating the amount of inflow of PM into the collector and estimating a basic amount of decreased PM that flows into the collector and is burned and decreased. The method also includes estimating the amount of ash deposited on the collector. The method further includes correcting the basic amount of decreased PM based on the estimated amount of ash. Moreover, the method includes estimating an amount of deposited PM by a history expression based on the estimated amount of inflow of PM and the corrected amount of decreased PM. A related device is also disclosed.

14 Claims, 7 Drawing Sheets

EXHAUST EMISSION CONTROL DEVICE FOR INTERNAL COMBUSTION ENGINE

CROSS REFERENCE TO RELATED APPLICATION(S)

The following is based on and claims priority to Japanese Patent Application No. 2005-324869, filed Nov. 9, 2005, which is hereby incorporated by reference.

FIELD OF THE INVENTION

The following relates to an exhaust emission control device for an internal combustion engine provided with a collector for collecting particulates contained in the exhaust gas of an internal combustion engine.

BACKGROUND OF THE INVENTION

It is known to provide a collector for collecting particulates in an exhaust pipe of an internal combustion engine. The collector reduces particulates in the exhaust gas flowing in the exhaust pipe.

Figure 13A:
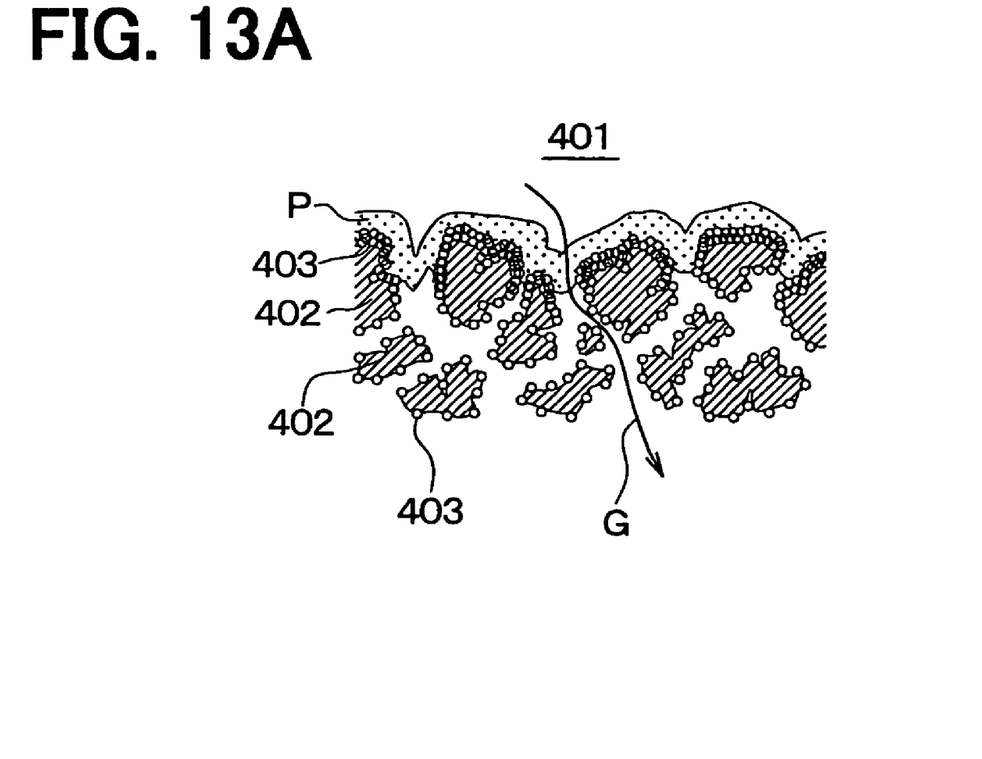
FIG. 13A and FIG. 13B are sectional views of a portion of a collector 4.

As shown in FIG. 13A, the collector is made of a porous partition wall 402 with many exhaust passages 401 extending therethrough. The collector adsorbs and collects particulates P as the exhaust gas G flows through the exhaust passages 401. As the particulates P are collected, pressure loss through the exhaust pipe increases and engine efficiency decreases. Thus, when the amount of deposit reaches a specified amount, the particulates P in the collector are burned to reduce the particulates P and recondition the collector. For instance, the collector includes oxidation catalysts 403, and HC is supplied to the collector to raise the temperature of the collector by means of a catalytic reaction of the HC.

To estimate the amount of particulates P collected, a differential pressure expression is used, which is based on a differential pressure detected across the collector and a history expression for estimating the amount of deposited particulates P. To estimate the amount of deposited particulates P in an estimation technique using a history expression, it has been proposed to compute the amount of decrease of particulates P on the basis of temperature in the collector. (See, for example, Japanese Patent Publication No. 2001-280118A.)

Estimation of the amount of particulates can be inaccurate depending on the age of the collector. For instance, when the collector is new as shown in FIG. 13A, the particulates P directly contact the oxidation catalysts 403. Hence, approximately all of the particulates P are reduced during reconditioning of the collector.

Figure 13B:
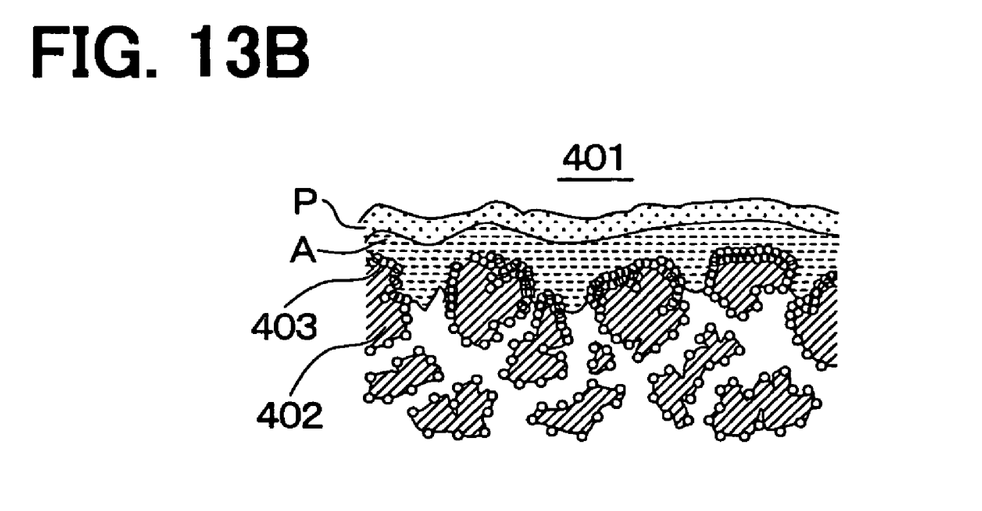

However, when the collector has been used for a significant time as shown in FIG. 13B, ash A of flame-retardant fine particles are deposited on the upstream side of the partition wall 402 and the oxidation catalysts 403 are substantially covered. As such, there is less contact between the particulates P and the oxidation catalysts 403, which leads to computational error of the amount of decrease of particulates P during reconditioning. Thus, the estimated amount of deposited particulates P may be inaccurate for an estimation technique that utilizes a history expression.

SUMMARY OF THE INVENTION

An exhaust emission control device is disclosed for an internal combustion engine which includes a collector for collecting particulates (PM) in exhaust gas from the engine, and which burns the particulates deposited on the collector to recondition the collector when the amount of collected PM in the collector is approximately equal to a predetermined amount. The device includes an inflow estimating device for estimating the amount of inflow of PM into the collector. The device also includes a decrease estimating device for estimating a basic amount of decreased PM that flows into the collector and is burned and decreased. Furthermore, the device also includes an ash estimating device for estimating the amount of ash deposited on the collector. Also, the device includes a correction device for correcting the basic amount of decreased PM based on the amount of ash estimated by the ash estimating device. The device additionally includes a PM deposit estimating device for estimating an amount of deposited PM by a history expression based on the amount of inflow of PM estimated by the inflow estimating device and the amount of decreased PM corrected by the correction device.

A method is also disclosed for estimating an amount of deposited particulates (PM) in a collector of an internal combustion engine, which burns the particulates deposited on the collector to recondition the collector when the amount of collected PM in the collector is approximately equal to a predetermined amount. The method includes estimating the amount of inflow of PM into the collector and estimating a basic amount of decreased PM that flows into the collector and is burned and decreased. The method further includes estimating the amount of ash deposited on the collector. Also, the method includes correcting the basic amount of decreased PM based on the estimated amount of ash. Moreover, the method includes estimating an amount of deposited PM by a history expression based on the estimated amount of inflow of PM and the corrected amount of decreased PM.

DETAILED DESCRIPTION OF THE PREFERRED EMBODIMENTS

Figure 1:
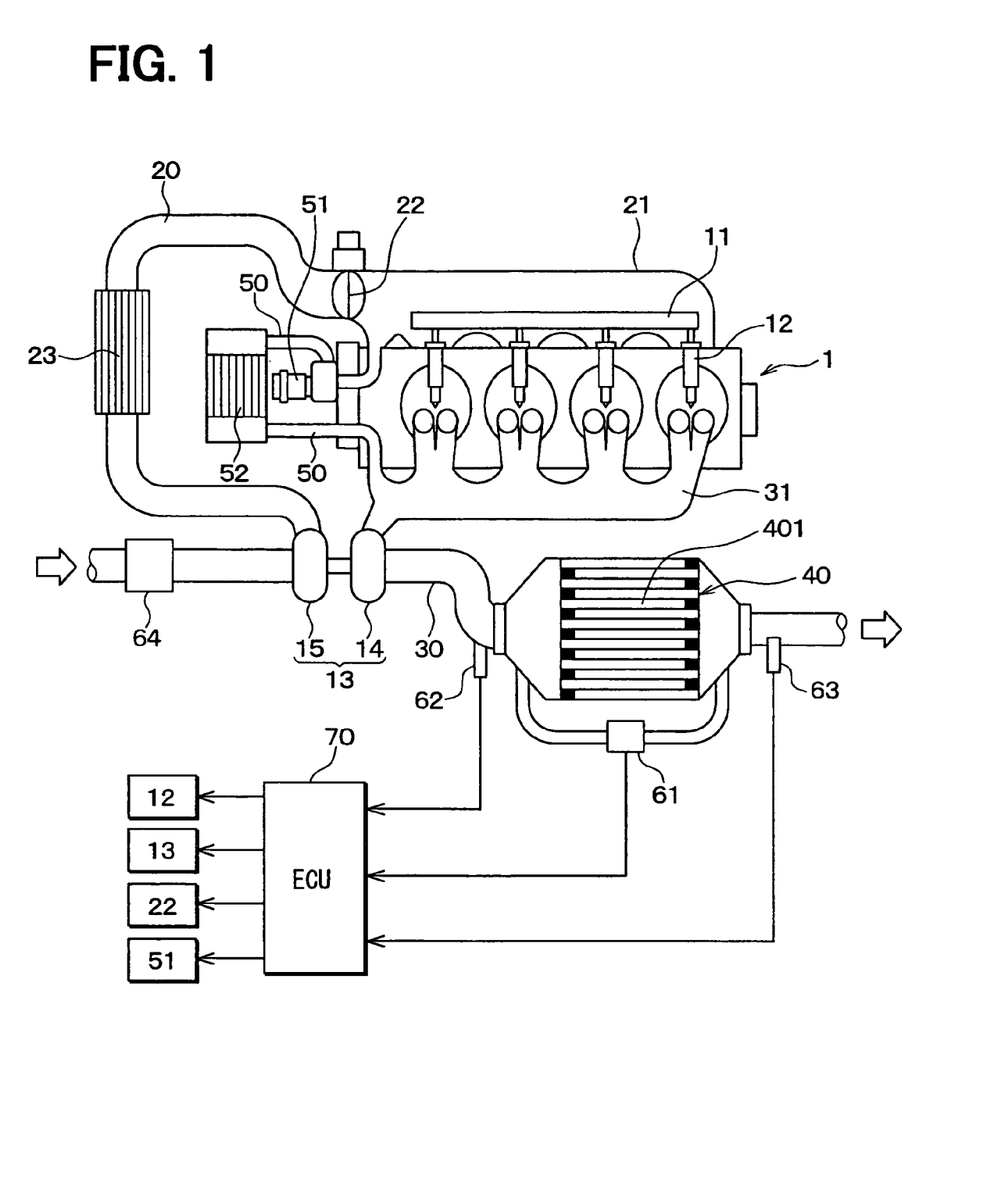
FIG. 1 is a schematic view of an internal combustion engine with one embodiment of an exhaust emission control device.

Referring initially to FIG. 1, one embodiment of an exhaust emission control device of an internal combustion engine 1 is illustrated. In the embodiment shown, the internal combustion engine 1 is a water-cooled diesel internal combustion engine mounted in a vehicle, which propels the vehicle. The internal combustion engine 1 includes a common rail 11 in which high-pressure fuel flows. The engine 1 also includes a plurality of fuel injection valves 12 in communication with the common rail 11 for injecting fuel into the cylinders of the internal combustion engine 1. The fuel is pressurized by a pump (not shown) driven by the internal combustion engine 1, and the pressurized fuel is pressure-fed to the common rail 11.

The intake manifold 21 of the internal combustion engine 1 is connected to an intake pipe 20, and an intake throttle 22 is disposed in a connection part. The passage area of an intake system is adjusted by the intake throttle 22 to thereby adjust the amount of flow of intake air.

The exhaust manifold 31 of the internal combustion engine 1 is in communication with an exhaust pipe 30. A collector 40 is provided in the exhaust pipe 30. The collector 40 is used to collect particulates (hereinafter referred to as "PM") in the exhaust gas.

In one embodiment, the collector 40 is formed of heat-resistant ceramic. In one embodiment, the collector 40 is formed of cordierite having a honeycomb structure. The inlets or outlets of the plurality of exhaust passages 401 are partitioned by porous partition walls and are closed alternately. Moreover, the porous partition walls include oxidation catalysts. The exhaust gas from the internal combustion engine 1 flows into the exhaust passages 401 and passes through the porous partition walls into the next exhaust passages 401. When the exhaust gas passes through the porous partition walls, PM is collected.

A turbine 14 of a centrifugal supercharger 13 is disposed on the upstream side of the collector 40 in the exhaust pipe 30. The turbine 14 is coupled to a compressor 15 disposed in the intake pipe 20 via a turbine shaft. As such, the turbine 14 is driven by thermal energy of the exhaust gas, and the compressor 15 is driven by the turbine shaft to compress intake air introduced into the intake pipe 20. Moreover, the boost pressure of the centrifugal supercharger 13 can be adjusted by changing the slant of a nozzle (not shown) disposed on the compressor 15.

An intercooler 23 is disposed in the intake pipe 20 on the downstream side of the compressor 15 and on the upstream side of the intake throttle 22. The intake air compressed and heated by the compressor 15 is cooled by the intercooler 23.

The exhaust manifold 31 is coupled to the intake manifold 21 through an EGR passage 50 and a part of exhaust gas is returned to an intake system through the EGR passage 50. An EGR valve 51 is disposed in the coupling portion of the EGR passage 50 and the intake manifold 21 and the passage area of the EGR passage 50 is adjusted by the EGR valve 51, whereby the amount of exhaust gas returned to the intake system is adjusted. Moreover, an EGR cooler 52 to cool the returned exhaust gas is provided in the EGR passage 50.

A differential pressure sensor 61 is also in communication with the exhaust pipe 30 for detecting a differential pressure across the collector 40. The pressure sensor 61 outputs an electric signal correlating to a differential pressure across the collector 40. One end side of the differential pressure sensor 61 is in communication with the exhaust pipe 30 on the upstream side of the collector 40, and the other side of the differential pressure sensor 61 is in communication with the exhaust pipe 30 on the downstream side of the collector 40.

Moreover, a first exhaust temperature sensor 62 is provided upstream of the collector 40 in communication with the exhaust pipe 30 for detecting temperature of the exhaust gas flowing into the collector 40. The first exhaust temperature sensor 62 outputs an electric signal correlating to the temperature of the exhaust gas flowing into the collector 40. A second exhaust temperature sensor 63 is also provided downstream of the collector 40 for detecting temperature of the exhaust gas flowing out of the collector 40. The second exhaust temperature sensor 63 outputs an electric signal correlating to the temperature of the exhaust gas flowing out of the collector 40.

Further, an air flow meter 64 for detecting the amount of flow of intake air is provided in the intake pipe 20 on the upstream side of the compressor 15.

An ECU 70 is provided with a well-known microcomputer constructed of a CPU, a ROM, an EEPROM, a RAM, and the like. The ECU 70 performs operation processing according to programs stored in the microcomputer. As will become apparent, the ECU 70 includes the inflow estimating device, the decrease estimating device, the ash estimating device, the correction device, and the PM deposit estimating device described in the claims.

Signals are input the ECU 70 from the differential pressure sensor 61, the first exhaust temperature sensor 62, the second exhaust temperature sensor 63, and the air flow meter 64. Further, the degree of opening of the intake throttle 22, the degree of opening of the EGR valve 51, the number of revolutions of the internal combustion engine, a vehicle speed, an accelerator position, a cooling water temperature, a crank position, and the signals from various kinds of sensors (not shown) for detecting a fuel pressure and the like are inputted to the ECU 70. Moreover, the ECU 70 controls the fuel injection valves 12, the centrifugal supercharger 13, the intake throttle 22, and the EGR valve 51.

Next, the operation of the exhaust emission control device of this embodiment will be described. In this embodiment, the amount of deposited PM is estimated using a combination of a differential pressure expression based on the differential pressure detected across the collector 40 and a history expression based on the amount of PM flowing into the collector 40 and the amount of decrease of PM in the collector 40.

In one embodiment, the method for computing the amount of deposited PM using a differential pressure expression is a well-known method. Hereinafter, a method for computing the amount of deposit of PM using a history expression will be described.

Figure 2:
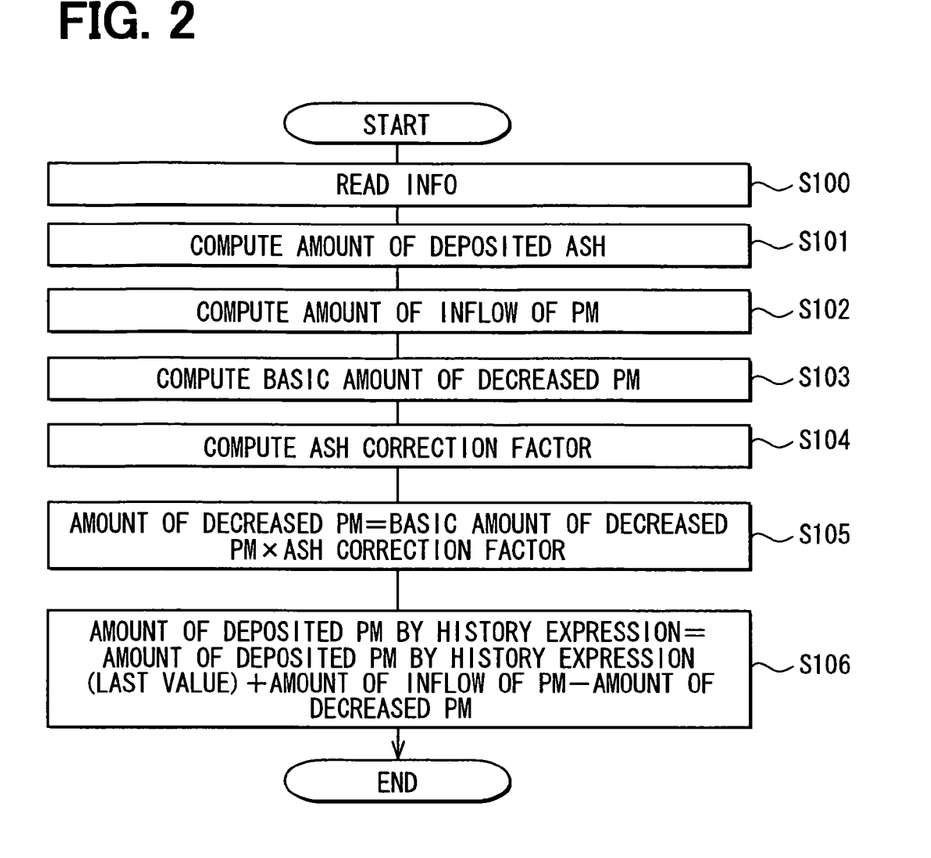
FIG. 2 is a flow chart representing a process of computing the amount of deposit of PM by a history expression.

FIG. 2 is a flow chart illustrating one embodiment of a process of computing the amount of deposited PM using a history expression. The ECU 70 performs the process. The process begins in step S100, wherein various kinds of information is read and input. Specifically, information is read including the differential pressure detected across the collector 40, which is sensed by the differential pressure sensor 61. The temperatures of the exhaust gas detected by the first and second temperature sensors 62, 63 are also read in step S100.

Furthermore, the number of revolutions of the internal combustion engine, and the amount of fuel injection is read in step S100.

Figure 3:
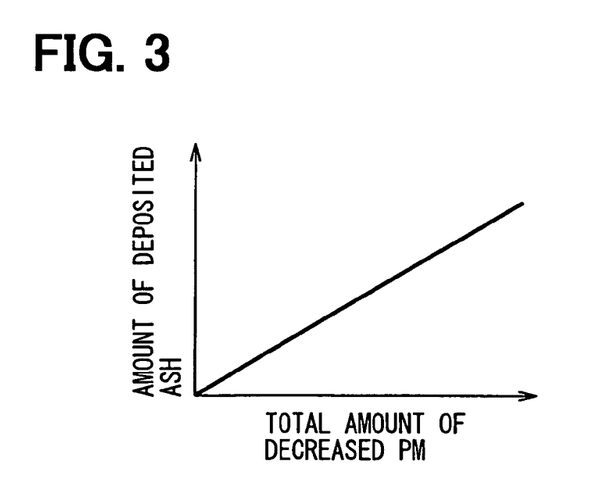
FIG. 3 is a characteristic graph illustrating the relationship between the total amount of decrease of PM and the amount of deposited ash.

Next, in step S101, the amount of ash deposited on the surfaces of the partition walls of the collector 40 is computed on the basis of the total amount of PM burned in the past in the collector 40 (that is, the total amount of decrease of PM). In one embodiment, a map is utilized in step S102 that correlates the amount of deposited ash with the total amount of decreased PM. For instance, a map is used similar to the map of FIG. 3, which shows a linear relationship between deposited ash and the total amount of decreased PM (i.e., deposited ash increases with an increase in total amount of decreased PM). The map is stored in the ROM of the ECU 70, and the amount of deposited ash is determined with this map. (An amount of decreased PM is found in step S105, and the amount is stored in the EEPROM of the ECU 70 as will be discussed below).

Next, in step S102, the amount of PM per unit time flowing into the collector 40 from the internal combustion engine 1 (hereinafter referred to as the amount of inflow of PM) is computed on the basis of the number of revolutions of the internal combustion engine and the amount of fuel injection read in step S100. In one embodiment, a map stored in the ECU 70 is used in step S102 that defines the relationship between the number of revolutions of the internal combustion engine, the amount of fuel injection, and the amount of inflow of PM.

Figure 4:
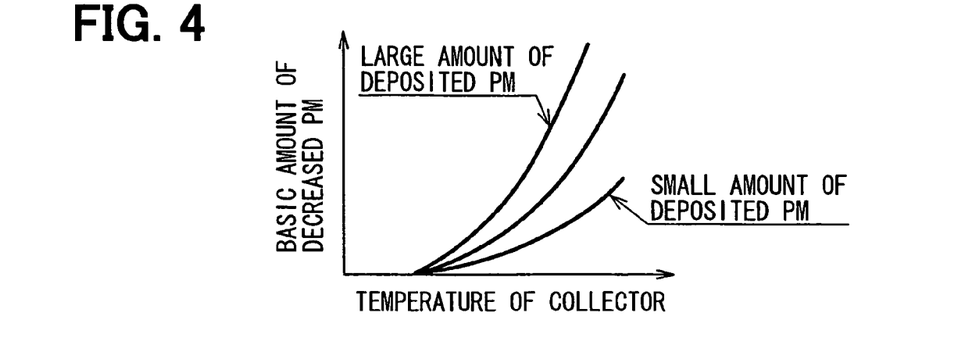
FIG. 4 is a characteristic graph illustrating the relationship between temperature in the collector and the amount of decrease of PM.

Next, in step S103, the amount of decreased PM in the state where there is approximately no deposited ash (hereinafter referred to as "the basic amount of decreased PM") is computed. The basic amount of decreased PM is computed based on the temperature in the collector 40 (e.g., the average of the temperatures detected by the first and second temperature sensors 62, 63) and the amount of deposited PM. (It is understood that the amount of decreased PM is the amount per unit time of PM burned and removed out of the deposited PM.) In one embodiment, a map stored in the ECU 70 is used to find the basic amount of decreased PM. For instance, the map of FIG. 4, which includes at least one characteristic line and the basic amount of decrease of PM, is found using the map. As shown in FIG. 4, the basic amount of decrease of PM increases along a curve of second order as temperature in the collector 40 increases, and the basic amount of decrease of PM increases as the amount of deposited PM increases.

Next, in step S104, an ash correction factor is computed based on the amount of deposited ash computed in step S101 and the temperature in the collector 40. The ash correction factor is used for correcting the basic amount of decreased PM and for finding a more accurate amount of decreased PM. Specifically, a map is used to compute the ash correction factor, such as the map shown in FIG. 5. The map of FIG. 5 includes a characteristic line showing the relationship between the amount of deposited ash and ash correction factor at different temperatures of the collector 40. The map is stored in ROM in the ECU 70.

Figure 5:
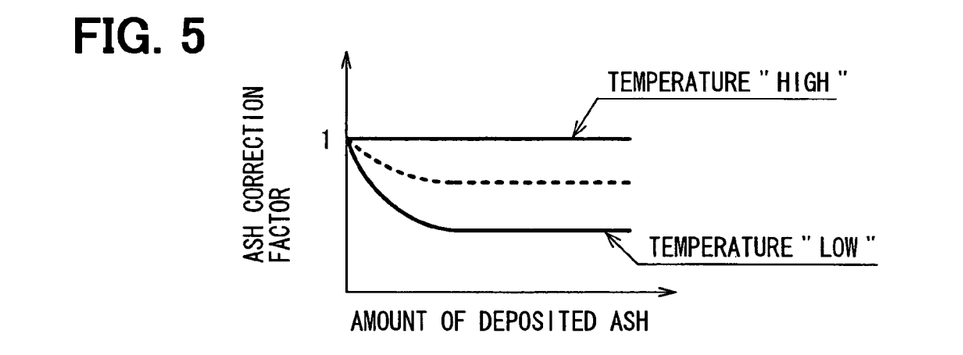
FIG. 5 is a characteristic graph illustrating the relationship between the amount of deposited ash and an ash correction factor.

As shown in FIG. 5, when the temperature in the collector 40 is within a "high" temperature range (e.g., 700° C. or more) in which PM can burn even without oxidation catalysts, the ash correction factor is one. When the temperature in the collector 40 is within a "low" temperature range (i.e., lower than a temperature at which PM can burn even without oxidation catalysts) the ash correction factor is less than one. As such, as temperature in the collector 40 becomes lower, the ash correction factor becomes smaller. As will be explained, the ash correction factor is used such that as temperature in the collector 40 becomes lower, the amount of decreased PM becomes smaller.

Next, in step S105, the amount of decreased PM is computed by multiplying the basic amount of decrease of PM (computed in step S103) by the ash correction factor (computed in step S104). In this manner, the amount of decreased PM can be computed within a small margin of error by making a correction in consideration of the present amount of deposited ash and the temperature in the collector 40. The integrated value of the amount of decreased PM is stored as the total amount of decreased PM in the EEPROM of the ECU 70.

Next, in step S106, the amount of deposited PM by a history expression is computed. Specifically, the amount of inflow of PM, computed in step S102, is added to the last amount of deposited PM by a history expression, which is stored in the EEPROM of the ECU 70, and then the amount of decreased PM, computed in step S105, is subtracted from the resultant addition to compute the present amount of deposited PM by a history expression. In this manner, the accuracy of the estimated amount of deposited PM by a history expression can be improved by using the amount of decreased PM computed in step S105 for less error.

Thus, when the amount of deposited PM by a history expression, computed in step S106 and/or the amount of deposited PM by a differential pressure expression reaches a specified value, the collector 40 is reconditioned using a well-known method, and the PM deposited on the collector 40 is burned and removed. It is understood that the embodiment represented in FIG. 2 allows for more accurate estimation of the amount of deposited PM by a history expression.

Figure 6:
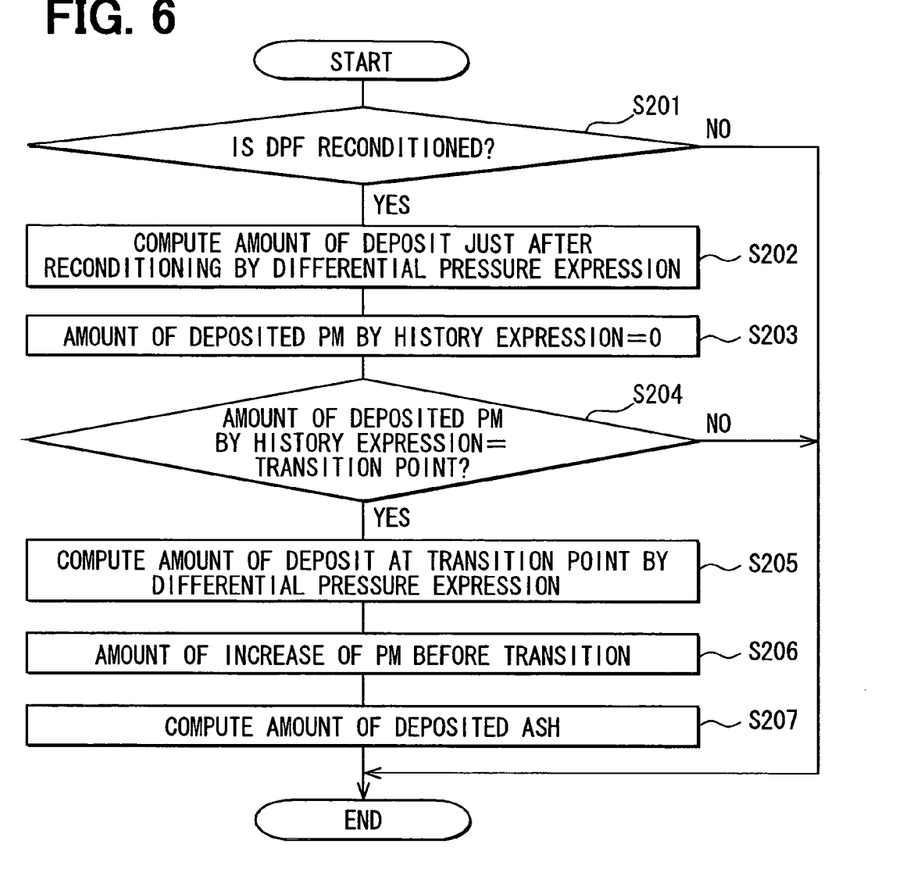
FIG. 6 is a flow chart representing a process of computing the amount of deposit of ash that is performed in an exhaust emission control device according to another embodiment.

Referring now to FIG. 6, another embodiment is illustrated. In the first embodiment described above, the amount of deposited ash is computed based on the total amount of decreased PM; however, in this embodiment the amount of deposited ash is computed based on a differential pressure across the collector 40. That is, the processing in step S101 in the first embodiment (FIG. 2) is replaced by the processing shown in FIG. 6. Other steps of the first embodiment remain substantially the same.

Figure 7:
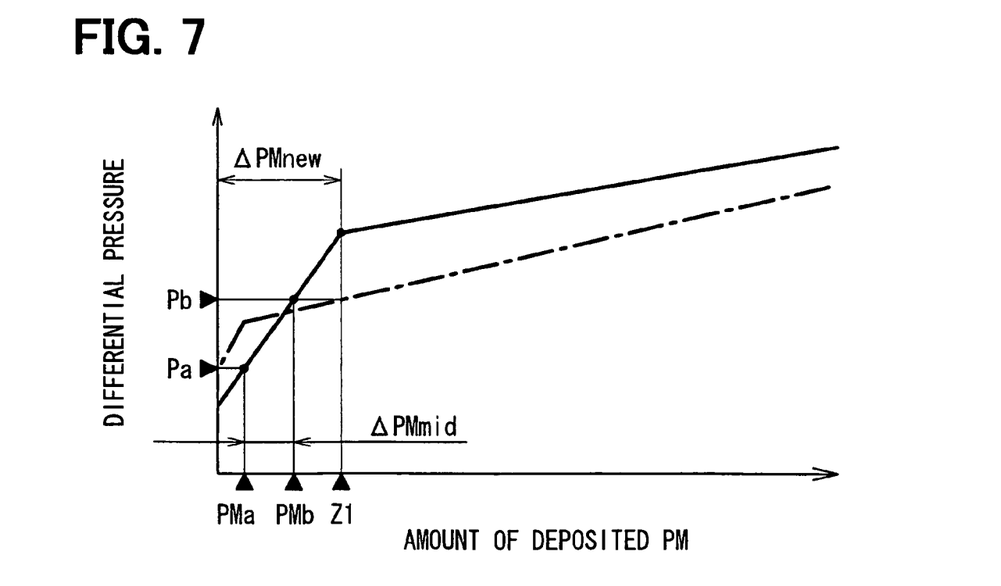
FIG. 7 is a characteristic graph illustrating the relationship between the amount of deposit of PM and a differential pressure across a collector.

First, the relationship between the amount of deposited PM and a differential pressure across the collector 40 as illustrated in FIG. 7 will be described. A solid line in FIG. 7 shows the relationship (hereinafter referred to as "initial deposit characteristic") between the amount of deposited PM and the differential pressure across the collector 40 when free of PM and ash (i.e., the collector 40 is brand-new or freshly reconditioned) in a fixed engine operating state. It is understood that as the collector 40 is used, PM deposits on the surfaces of the partition walls 402 and is the predominant cause of increasing differential pressure across the collector 40.

In a first region where the amount of deposited PM ranges from zero (i.e., an initial point to a transition point Z1) the PM enter and clog the fine pores of the partition walls 402 of the collector 40 (refer to FIG. 13). In one embodiment, the transition point Z1 is a point at which the amount of deposit of PM per unit volume of the collector 40 is approximately 1 g/l. As such, as the amount of deposited PM increases, the differential pressure across the collector 40 increases rapidly. Moreover, in a second region beyond the transition point Z1 in which the PM clogs many of the fine pores and then deposits in a layer, the differential pressure across the collector 40 increases less rapidly than in the first region.

A single broken line in FIG. 7 shows the relationship between the amount of deposit of PM and the differential pressure across the collector 40 when ash begins to deposit (hereinafter referred to as "intermediate deposit characteristic"). In this case, the differential pressure across the collector when the amount of deposit of PM is zero (i.e., immediately after the collector 40 is reconditioned) is slightly larger than the differential pressure across the collector 40 of the initial deposit characteristic because of the effect of the ash deposited on the surface of the collector 40. Moreover, in the first region where the amount of deposit of PM ranges from an initial point to the transition point Z1, the ash inhibits the PM from entering the fine pores. Therefore, the PM begins to deposit in a layer on the surface of the partition walls 402 in a state where the amount of deposit of PM is smaller than the initial deposit characteristic. Then, the differential pressure across the collector 40 increases less rapidly than the initial deposit characteristic. Further, in the second region where the amount of deposited PM exceeds the transition point Z1, the surface areas of the partition walls 402 are decreased by the ash depositing on the upstream side of the exhaust passages 401, so the differential pressure across the collector 40 increases more rapidly than the initial deposit characteristic.

FIG. 6 is a flow chart illustrating a process of computing the amount of deposited ash (corresponding to step S101 in FIG. 2). First, in step S201, it is determined whether or not the collector 40 is completely reconditioned and hence brought to a state where the amount of deposit of PM is considered to be approximately zero. When reconditioning of the collector 40 is completed, step S201 is answered in the affirmative, and then the routine proceeds to step S202.

In step S202, the amount of deposited PM is computed on the basis of the differential pressure across the collector 40 by the use of the initial deposit characteristic (e.g., the solid line of FIG. 7), stored in the ROM of the ECU 70. The amount computed in step S202 is stored in the EEPROM of the ECU 70. The value computed at this time is referred to as the amount of deposit just after reconditioning by a differential pressure expression.

Next, in step S203, the amount of deposited PM by a history expression is reset to zero because the collector 40 has just been reconditioned.

Next, in step S204, it is determined whether the amount of deposited PM by a history expression reaches the transition point Z1. When the amount of deposited PM by a history expression reaches the transition point Z1 (i.e., when step S204 is answered in the affirmative), the routine proceeds to step S205.

In step S205, the amount of deposited PM is computed on the basis of the differential pressure across the collector 40 by the use of the initial deposit characteristic in FIG. 7 and is stored in the EEPROM of the ECU 70. The value computed this time is referred to as the amount of deposit at a transition point by a differential pressure expression.

Next, in step S206, the amount of deposit just after reconditioning by a differential pressure expression (computed in step S202) is subtracted from the amount of deposit at a transition point by a differential pressure expression (computed in step S205) to compute the amount of increase of PM before transition.

Here, when it is assumed that the collector 40 is operating in the intermediate stage, as shown in FIG. 7, the actual differential pressure across the collector 40, which is sensed during step S202, becomes a value Pa when the amount of deposit of PM in the intermediate deposit characteristic (e.g., the broken line of FIG. 7) is zero. The amount of deposit just after conditioning by a differential pressure expression, which is computed in step S202, becomes PMa from the value Pa of this differential pressure across the collector 40 and the initial deposit characteristic (the solid line). Moreover, when the stage of use of the collector 40 is the intermediate stage, as shown in FIG. 7, the actual differential pressure across the collector 40, which is sensed during step S205, becomes a value Pb when the amount of deposited PM in the intermediate deposit characteristic (broken line) is the transition point Z. The amount of deposit at a transition point by a differential pressure expression, which is computed in step S205, becomes PMb from this value Pb of the differential pressure across the collector 40 and the initial deposit characteristic (solid line).

As shown in FIG. 7, when the stage of use of the collector 40 is the initial stage, the amount of increase of PM before transition, which is computed in step S206, becomes ΔPm-new. However, when the stage of use of the collector 40 is the intermediate stage, the amount of increase of PM before transition, which is computed in step S206, becomes ΔPM-mid. That is, as the stage of use of the collector 40 advances, the amount of increase of PM before transition, which is computed in step S206, becomes smaller.

Figure 8:
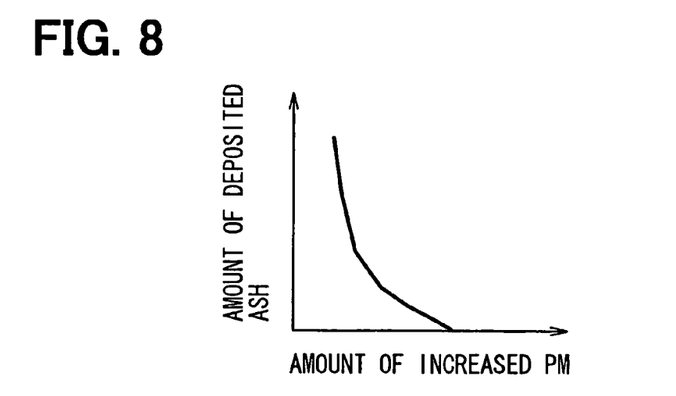
FIG. 8 is a characteristic graph illustrating the relationship between the amount of increase of PM before transition and the amount of deposited ash.

When the routine proceeds from step S206 to step S207, the amount of deposited ash is computed in step S207 on the basis of the amount of increase of PM before transition, which is computed in step S206. Specifically, a map of characteristic line in which as the amount of increase of PM before transition becomes smaller. In other words, as the stage of use of the collector 40 advances, the amount of deposit of ash increases, as shown in FIG. 8, is stored in the ROM of the ECU 70 and the amount of deposit of ash is found from the map.

After the amount of deposited ash is computed in the manner described above, the processing following step S102 in FIG. 2 in the first embodiment is performed.

Figure 9:
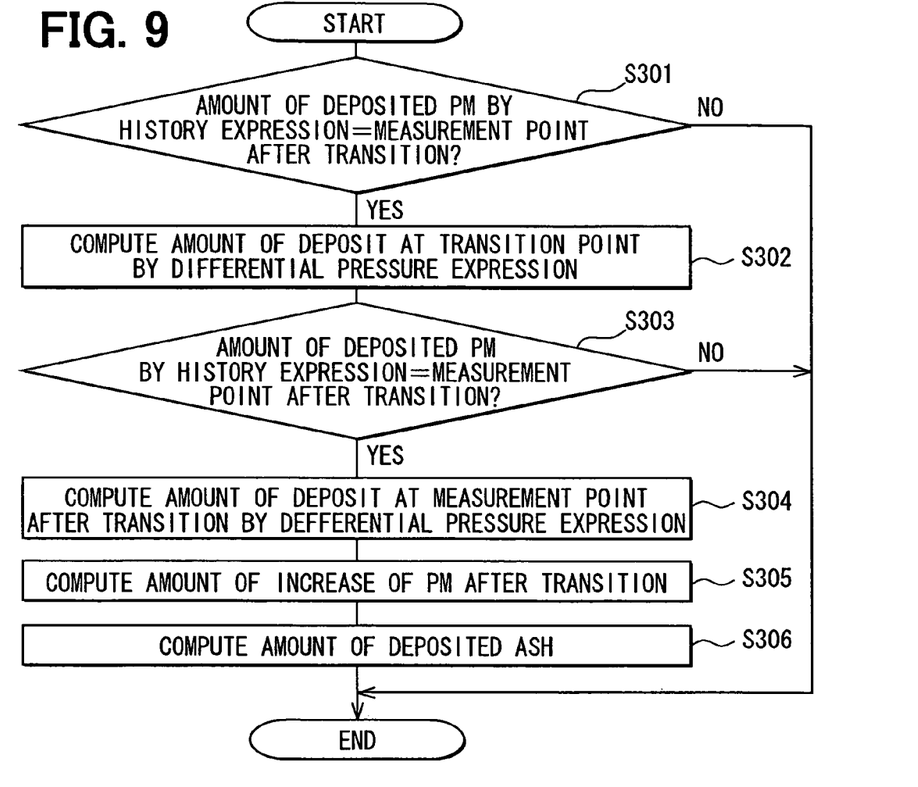
FIG. 9 is a flow chart representing a process of computing the amount of deposit of ash that is performed in an exhaust emission control device according to another embodiment.
Figure 10:
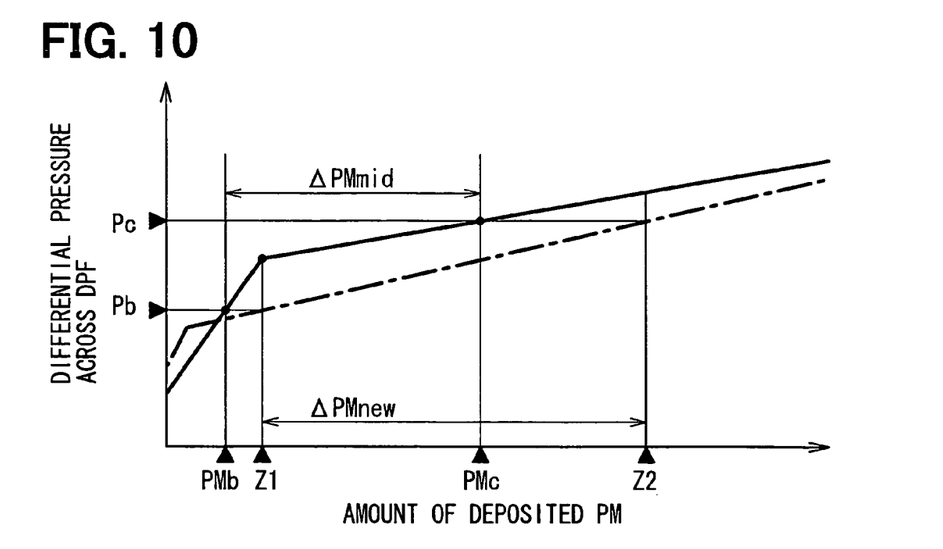
FIG. 10 is a characteristic graph illustrating the relationship between the amount of deposit of PM and a differential pressure across a collector.
Figure 11:
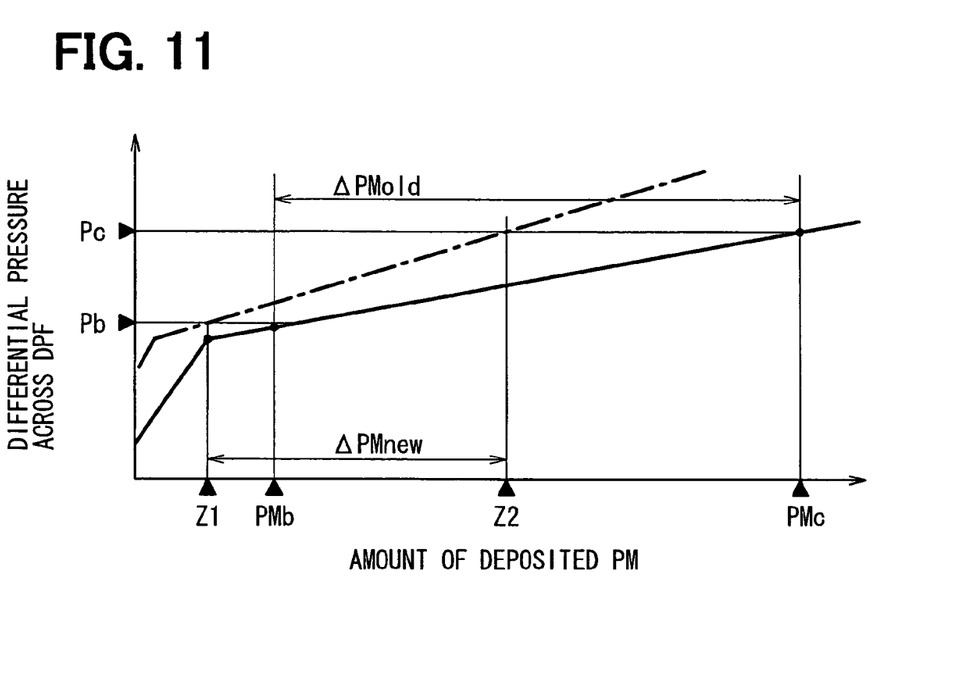
FIG. 11 is a characteristic graph illustrating the relationship between the amount of deposit of PM and a differential pressure across a collector.

Referring now to FIGS. 9-11, another embodiment is illustrated. In the embodiment of FIG. 6-8, the amount of deposit of ash is computed based on the differential pressure across the collector 40 in the first region in which the amount of deposit of PM ranges from zero (i.e., the initial point to the transition point Z1). However, in this embodiment, the amount of deposit of ash is computed on the basis of the differential pressure across the collector 40 in the second region in which the amount of deposit of PM goes beyond the transition point Z1. That is, the processing in step S101 in FIG. 2 is changed to the processing in FIG. 9. The other steps of FIG. 2 and the construction of the exhaust emission control device of FIG. 1 are substantially the same.

FIG. 10 and FIG. 11 show the relationship between the amount of deposited PM and the differential pressure across the collector 40. Solid lines in FIG. 10 and FIG. 11 show the initial deposit characteristic. A broken line in FIG. 10 shows the relationship as the use of the collector 40 advances to the intermediate stage (i.e., an intermediate deposit characteristic). A broken line in FIG. 11 shows the relationship as the use of the collector 40 advances to a final stage (i.e., a final deposit characteristic). In the final deposit characteristic, in the second region where the amount of deposit PM goes beyond the transition point Z1, the differential pressure across the collector 40 increases more rapidly than in the intermediate deposit characteristic because the surface areas of the partition walls 402 are further decreased by an increase in ash deposited on the downstream side in the exhaust passages 401.

FIG. 9 is a flow chart showing one embodiment of the processing of computing the amount of deposited ash (corresponding to step S101 of FIG. 2). First, in step S301, it is determined whether the amount of deposit of PM by a history expression reaches the transition point Z1. When the amount of deposited PM by a history expression reaches the transition point Z1 (i.e., when step S301 is answered in the affirmative), the routine proceeds to step S302.

In step S302, the amount of deposited PM is computed on the basis of the differential pressure across the collector 40 by the use of the initial deposit characteristic in FIG. 10 and is stored in the EEPROM of the ECU 70. The value computed during step S302 is hereinafter referred to as the amount of deposit at a transition point by a differential pressure expression.

Next, in step S303, it is determined whether the amount of deposited PM by a history expression reaches a measurement point Z2 after transition. When the amount of deposited PM by a history expression reaches the measurement point Z2 after transition (i.e., when step S303 is answered in the affirmative), the routine proceeds to step S304. It is understood that Z1 is less than Z2 (i.e., Z1<Z2).

Subsequently, in step S304, the amount of deposited PM is computed on the differential pressure across the collector 40 by the use of the initial deposit characteristic in FIG. 10 and is stored in the EEPROM of the ECU 70. The value computed at this time is hereinafter referred to as the amount of deposit at a measurement point after transition by a differential pressure expression.

Next, in step S305, the amount of deposit at a measurement point after transition by a differential pressure expression, which is computed in step S302, is subtracted from the amount of deposit at a transition point by a differential pressure expression, which is computed in step S302, to compute the amount of increase of PM after transition.

Here, if it is assumed that the stage of use of the collector 40 is the intermediate stage, as shown in FIG. 10, the actual differential pressure across the collector 40, which is sensed at the time of step S302, becomes a value Pb when the amount of deposit of PM in the intermediate deposit characteristic (broken line) is the transition point Z1. The amount of deposit at a transition point by a differential pressure expression, which is computed in step S302, becomes PMb from the value Pb of this differential pressure and the initial deposit characteristic (solid line). Moreover, when the stage of use of the collector 40 is the intermediate stage, as shown in FIG. 10, the actual differential pressure across the collector 40, which is sensed at the time of step S304, becomes a value Pc when the amount of deposit of PM in the intermediate deposit characteristic (broken line) is the measurement point after transition point Z2. The amount of deposit at a measurement point after transition by a differential pressure expression, which is computed in step S304, becomes PMc from the value Pc of this differential pressure and the initial deposit characteristic (solid line).

As shown in FIG. 10, when the stage of use of the collector 40 is the initial stage, the amount of increase of PM after transition, which is computed in step s305, is ΔPMnew. However, when the stage of use of the collector 40 is the intermediate stage, the amount of increase of PM after transition, which is computed in step s305, becomes ΔPMmid and ΔPMnew>ΔPMmid. That is, in a region where the stage of use of the collector 40 ranges from the initial stage to the intermediate stage (i.e., in a region where the amount of deposit of ash is small) the amount of increase of PM after transition (computed in step S305) becomes smaller as the stage of use of the collector 40 advances.

In contrast, when it is assumed that the stage of use of the collector 40 is the final stage, as shown in FIG. 11, the actual differential pressure across the collector 40 (sensed during step S302) becomes a value Pb when the amount of deposit of PM in a final deposit characteristic (broken line) is the transition point Z1. The amount of deposit at a transition point by a differential pressure expression, which is computed in step S302, becomes PMb from the value Pb of the differential pressure and the initial deposit characteristic (solid line). Moreover, when the stage of use of the collector 40 is the final stage, as shown in FIG. 11, the actual differential pressure across the collector 40 (sensed during step S304) becomes a value Pc when the amount of deposited PM in a final deposit characteristic (broken line) is the measurement point after transition point Z2. The amount of deposit at a measurement point after transition by a differential pressure expression (computed in step S304) becomes PMc from the value Pc of this differential pressure and the initial deposit characteristic (solid line).

As shown in FIG. 11, when the stage of use of the collector 40 is the initial stage, the amount of increase of PM after transition (computed in step s305) is ΔPMnew. However, when the stage of use of the collector 40 is the final stage, the amount of increase of PM after transition (computed in step s305) becomes ΔPMold and ΔPMnew is less than ΔPMold (i.e., ΔPMnew<ΔPMold). That is, in a region where the stage of use of the collector 40 reaches the final stage and the amount of deposited ash becomes large, the amount of increase of PM after transition (computed in step S305) becomes larger, as the stage of use of the collector 40 advances.

Figure 12:
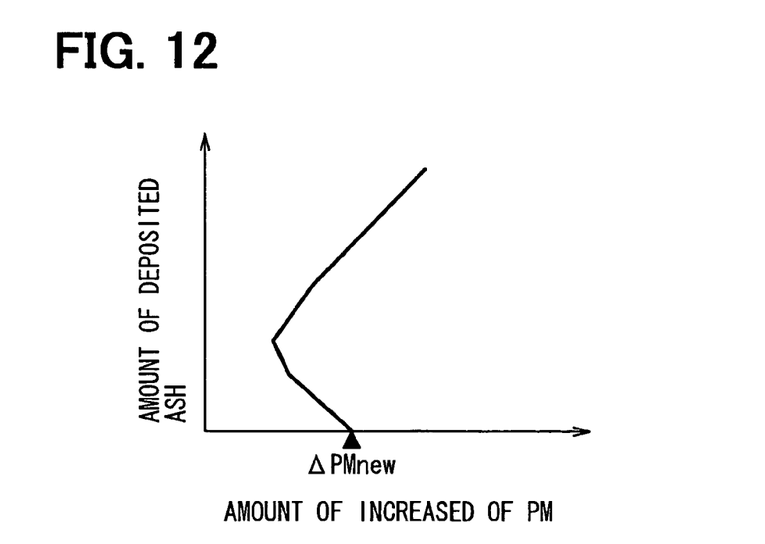
FIG. 12 is a characteristic graph illustrating the relationship between the amount of increase of PM after transition and the amount of deposited ash.

When the routine proceeds from the step S305 to step S306, the amount of deposited ash is computed in step S306 on the basis of increase of PM after transition, which is computed in step S305. Specifically, as shown in FIG. 12, a map of a characteristic line, in which in a region where the amount of deposited ash ranges from zero (i.e., an initial point to a specified value, or in a range where the amount of deposit of ash is small as the amount of deposited ash increases) the amount of deposited PM after transition decreases. In a region where the amount of deposit of ash reaches the specified value and then becomes larger than the specified value (i.e., in a region where the amount of deposited ash is large) as the amount of deposit of ash increases, the amount of increase of PM after transition increases. The value is stored in the ROM of the ECU 70, and the amount of deposited ash is found from the map.

The amount of deposited ash estimated last time (hereinafter referred to as "the last estimated amount of deposit of ash") is stored in the ROM of the ECU 70. When the last estimated amount of deposit of ash is less than a specified value, as the amount of increase of PM after transition becomes smaller, the estimated value of the amount of deposited ash becomes larger. When the last estimated amount of deposited ash is the specified value or larger, as the amount of increase of PM after transition becomes larger, the estimated value of the amount of deposited ash becomes larger.

After the amount of deposited ash is computed in the manner described above, the processing following step S102 in FIG. 2 is performed.

What is claimed is:

1. An exhaust emission control device for an internal combustion engine which includes a collector that collects particulates (PM) in exhaust gas from the engine, and which burns the particulates deposited on the collector to recondition the collector when the amount of collected PM in the collector is approximately equal to a predetermined amount, the device comprising:
   an inflow estimating device for estimating the amount of inflow of PM into the collector;
   a decrease estimating device for estimating a basic amount of decreased PM that flows into the collector and is burned and decreased;

an ash estimating device for estimating the amount of ash deposited on the collector;

a correction device for correcting the basic amount of decreased PM based on the amount of ash estimated by the ash estimating device such that the amount of decreased PM decreases as the amount of ash estimated by the ash estimating device increases; and a PM deposit estimating device for estimating an amount of deposited PM by a history expression based on the amount of inflow of PM estimated by the inflow estimating device and the amount of decreased PM corrected by the correction device.

2. The exhaust emission control device according to claim 1, wherein the decrease estimating device estimates the basic amount of decreased PM in a state where the amount of deposited ash is approximately zero based on the amount of deposited particulates and temperature in the collector.

3. The exhaust emission control device according to claim 1, wherein the decrease estimating device estimates the basic amount of decreased PM such that, as temperature in the collector decreases, the estimated basic amount of decreased PM decreases.

4. The exhaust emission control device according to claim 3, wherein the decrease estimating device estimates the basic amount of decreased PM in a state where the amount of deposited ash is approximately zero based on the amount of deposited particulates and temperature in the collector, and wherein the correction device corrects the basic amount of decreased PM also based on the temperature in the collector.

5. The exhaust emission control device according to claim 1, wherein the ash estimating device estimates the amount of ash deposited on the collector such that, as the total amount of particulates burned in the past in the collector increases, the estimated amount of ash deposited on the collector increases.

6. An exhaust emission control device for an internal combustion engine which includes a collector that collects particulates (PM) in exhaust gas from the engine, and which burns the particulates deposited on the collector to recondition the collector when the amount of collected PM in the collector is approximately equal to a predetermined amount, the device comprising:

an inflow estimating device for estimating the amount of inflow of PM into the collector;

a decrease estimating device for estimating a basic amount of decreased PM that flows into the collector and is burned and decreased;

an ash estimating device for estimating the amount of ash deposited on the collector;

a correction device for correcting the basic amount of decreased PM based on the amount of ash estimated by the ash estimating device; and a PM deposit estimating device for estimating an amount of deposited PM by a history expression based on the amount of inflow of PM estimated by the inflow estimating device and the amount of decreased PM corrected by the correction device;

wherein the ash estimating device estimates the amount of ash deposited on the collector using a differential pressure expression and a particulate deposit characteristic that correlates an amount of deposited particulates and a differential pressure across the collector, such that the amount of deposited particulates is estimated based on the detected differential pressure, wherein the particulate deposit characteristic includes a first region in which the amount of deposited particulates is between zero and a transition point, wherein the particulate deposit characteristic includes a second region in which the amount of deposited particulates exceeds the transition point, wherein, as the amount of deposited particulates increases, the differential pressure increases less rapidly in the second region than in the first region, wherein the estimated amount of deposited particulates according to the differential pressure expression just after the collector is reproduced is an amount of deposit just after reproduction by the differential pressure expression, wherein the estimated amount of deposited particulates according to the differential pressure expression at a time when the estimated amount of deposited particulates according to the history expression reaches the transition point is an amount of deposit at the transition point by the differential pressure expression, wherein a difference between the amount of deposit just after reproduction by the differential pressure expression and the amount of deposit at the transition point by a differential pressure expression is the amount of increase of PM before transition, and wherein the ash estimating device estimates the amount of ash in such a way that as the amount of increase of PM before transition reduces, the amount of deposited ash increases.

7. An exhaust emission control device for an internal combustion engine which includes a collector that collects particulates (PM) in exhaust gas from the engine, and which burns the particulates deposited on the collector to recondition the collector when the amount of collected PM in the collector is approximately equal to a predetermined amount, the device comprising:

an inflow estimating device for estimating the amount of inflow of PM into the collector;

a decrease estimating device for estimating a basic amount of decreased PM that flows into the collector and is burned and decreased;

an ash estimating device for estimating the amount of ash deposited on the collector;

a correction device for correcting the basic amount of decreased PM based on the amount of ash estimated by the ash estimating device; and a PM deposit estimating device for estimating an amount of deposited PM by a history expression based on the amount of inflow of PM estimated by the inflow estimating device and the amount of decreased PM corrected by the correction device;

wherein the ash estimating device estimates the amount of ash deposited on the collector using a differential pressure expression and a deposit characteristic that correlates an amount of deposited particulates and a differential pressure across the collector, such that the amount of deposited particulates is estimated based on the detected differential pressure, wherein the deposit characteristic includes a first region in which the amount of deposited particulates is between zero and a transition point and in which the differential pressure increases as the amount of deposited particulates increases, wherein the particulate deposit characteristic includes a second region in which the amount of deposited particulates exceeds the transition point, wherein, as the amount of deposited particulates increases, the differential pressure increases less rapidly in the second region than in the first region, wherein the estimated amount of deposited of particulates according to the differential pressure expression, at a time when the estimated amount of deposited particulates according to the history expression reaches the transition point after the collector is reconditioned, is the amount of deposit at the transition point by a differential pressure expression;

wherein the estimated amount of deposited particulates according to the differential pressure expression, at a time when the estimated amount of deposited particulates according to the history expression exceeds the transition point by a predetermined amount, is the amount of deposit at a measurement point after transition by a differential expression, wherein a difference between the amount of deposit at a transition point by a differential pressure expression and the amount of deposit at a measurement point after transition by a differential pressure expression is the amount of increase of PM after transition, wherein the ash estimating device estimates the amount of ash deposited on the collector on the basis of an ash deposit characteristic to establish correspondence between the amount of increase of PM after transition and the amount of deposited ash using the amount of increase of PM after transition, and wherein the ash deposit characteristic is such that, in a region where the amount of deposited ash is between zero and a predetermined amount, the amount of increase of PM after transition decreases as the amount of deposited ash increases, and such that in a region where the amount of deposited ash reaches and exceeds the predetermined value, the amount of increase of PM after transition increases as the amount of deposited ash increases.

8. A method of estimating an amount of deposited particulates (PM) in a collector of an internal combustion engine, which burns the particulates deposited on the collector to recondition the collector when the amount of collected PM in the collector is approximately equal to a predetermined amount, the method comprising:

estimating the amount of inflow of PM into the collector;
estimating a basic amount of decreased PM that flows into the collector and is burned and decreased;
estimating the amount of ash deposited on the collector;
correcting the basic amount of decreased PM based on the estimated amount of ash such that the amount of decreased PM decreases as the estimated amount of ash increases; and
estimating an amount of deposited PM by a history expression based on the estimated amount of inflow of PM and the corrected amount of decreased PM.

9. The method according to claim 8, wherein estimating the basic amount of decreased PM comprises estimating the basic amount of decreased PM in a state where the amount of deposited ash is approximately zero based on the amount of deposited particulates and temperature in the collector.

10. The method according to claim 8, wherein estimating the basic amount of decreased PM comprises estimating the basic amount of decreased PM such that, as temperature in the collector decreases, the estimated basic amount of decreased PM decreases.

11. The method according to claim 10, wherein estimating the basic amount of decreased PM comprises estimating the basic amount of decreased PM in a state where the amount of deposited ash is approximately zero based on the amount of deposited particulates and temperature in the collector, and wherein correcting the basic amount of decreased PM comprises correcting the basic amount of decreased PM also based on the temperature in the collector.

12. The method according to claim 8, wherein the ash estimating device estimates the amount of ash deposited on the collector such that, as the total amount of particulates burned in the past in the collector increases, the estimated amount of ash deposited on the collector increases.

13. A method of estimating an amount of deposited particulates (PM) in a collector of an internal combustion engine, which burns the particulates deposited on the collector to recondition the collector when the amount of collected PM in the collector is approximately equal to a predetermined amount, the method comprising:

estimating the amount of inflow of PM into the collector;
estimating a basic amount of decreased PM that flows into the collector and is burned and decreased;
estimating the amount of ash deposited on the collector;
correcting the basic amount of decreased PM based on the estimated amount of ash; and
estimating an amount of deposited PM by a history expression based on the estimated amount of inflow of PM and the corrected amount of decreased PM;
wherein estimating the amount of ash comprises estimating the amount of ash deposited on the collector using a differential pressure expression and a particulate deposit characteristic that correlates an amount of deposited particulates and a differential pressure across the collector, such that the amount of deposited particulates is estimated based on the detected differential pressure,
wherein the particulate deposit characteristic includes a first region in which the amount of deposited particulates is between zero and a transition point,
wherein the particulate deposit characteristic includes a second region in which the amount of deposited particulates exceeds the transition point,
wherein, as the amount of deposited particulates increases, the differential pressure increases less rapidly in the second region than in the first region,
wherein the estimated amount of deposited particulates according to the differential pressure expression just after the collector is reproduced is an amount of deposit just after reproduction by the differential pressure expression,
wherein the estimated amount of deposited particulates according to the differential pressure expression at a time when the estimated amount of deposited particulates according to the history expression reaches the transition point is an amount of deposit at the transition point by the differential pressure expression,
wherein a difference between the amount of deposit just after reproduction by the differential pressure expression and the amount of deposit at the transition point by a differential pressure expression is the amount of increase of PM before transition, and
wherein estimating the amount of ash occurs such that as the amount of increase of PM before transition reduces, the amount of deposited ash increases.

14. A method of estimating an amount of deposited particulates (PM) in a collector of an internal combustion engine, which burns the particulates deposited on the collector to recondition the collector when the amount of collected PM in the collector is approximately equal to a predetermined amount, the method comprising:

estimating the amount of inflow of PM into the collector;
estimating a basic amount of decreased PM that flows into the collector and is burned and decreased;
estimating the amount of ash deposited on the collector;

correcting the basic amount of decreased PM based on the estimated amount of ash; and estimating an amount of deposited PM by a history expression based on the estimated amount of inflow of PM and the corrected amount of decreased PM;

wherein estimating the amount of ash deposited on the collector comprises using a differential pressure expression and a deposit characteristic that correlates an amount of deposited particulates and a differential pressure across the collector, such that the amount of deposited particulates is estimated based on the detected differential pressure, wherein the deposit characteristic includes a first region in which the amount of deposited particulates is between zero and a transition point and in which the differential pressure increases as the amount of deposited particulates increases, wherein the particulate deposit characteristic includes a second region in which the amount of deposited particulates exceeds the transition point, wherein, as the amount of deposited particulates increases, the differential pressure increases less rapidly in the second region than in the first region, wherein the estimated amount of deposited of particulates according to the differential pressure expression, at a time when the estimated amount of deposited particulates according to the history expression reaches the transition point after the collector is reconditioned, is the amount of deposit at the transition point by a differential pressure expression;

wherein the estimated amount of deposited particulates according to the differential pressure expression, at a time when the estimated amount of deposited particulates according to the history expression exceeds the transition point by a predetermined amount, is the amount of deposit at a measurement point after transition by a differential expression, wherein a difference between the amount of deposit at a transition point by a differential pressure expression and the amount of deposit at a measurement point after transition by a differential pressure expression is the amount of increase of PM after transition, wherein estimating the amount of ash deposited on the collector occurs on the basis of an ash deposit characteristic to establish correspondence between the amount of increase of PM after transition and the amount of deposited ash using the amount of increase of PM after transition, and wherein the ash deposit characteristic is such that, in a region where the amount of deposited ash is between zero and a predetermined amount, the amount of increase of PM after transition decreases as the amount of deposited ash increases, and such that in a region where the amount of deposited ash reaches and exceeds the predetermined value, the amount of increase of PM after transition increases as the amount of deposited ash increases.

* * * * *